US005477003A

United States Patent [19]

Muraki et al.

[11] Patent Number: 5,477,003

[45] Date of Patent: Dec. 19, 1995

[54] KARAOKE SOUND PROCESSOR FOR AUTOMATICALLY ADJUSTING THE PITCH OF THE ACCOMPANIMENT SIGNAL

[75] Inventors: Kenji Muraki, Osaka; Katsuyoshi Fujii, Moriguchi, both of Japan

[73] Assignee: Matsushita Electric Industrial Co., Ltd., Kadoma, Japan

[21] Appl. No.: 78,961

[22] Filed: Jun. 17, 1993

[51] Int. Cl.[6] .............................. G09B 15/04; G10H 1/36

[52] U.S. Cl. ................................ 84/610; 84/616; 84/634; 84/654; 84/619; 84/657

[58] Field of Search .............................. 84/600, 609, 610, 84/619, 616, 645, 625, 634, 654, 657

[56] References Cited

U.S. PATENT DOCUMENTS

| | | | |
|---|---|---|---|
| 4,771,671 | 9/1988 | Hoff, Jr. . | |
| 5,194,682 | 3/1993 | Okamura et al. | 84/625 |
| 5,208,413 | 5/1993 | Tsumura et al. | 84/615 |
| 5,235,124 | 8/1993 | Okamura et al. | 84/601 |
| 5,250,745 | 10/1993 | Tsumura | 84/600 X |
| 5,296,643 | 3/1994 | Kuo et al. | 84/610 |

FOREIGN PATENT DOCUMENTS

| | | |
|---|---|---|
| 488732A2 | 6/1992 | European Pat. Off. . |
| 5-35286 | 2/1993 | Japan . |

OTHER PUBLICATIONS

European Search Report dated Jul. 30, 1993.

*Primary Examiner*—William M. Shoop, Jr.
*Assistant Examiner*—Jeffrey W. Donels
*Attorney, Agent, or Firm*—Ratner & Prestia

[57] ABSTRACT

A karaoke sound processor that automatically adjusts to the pitch of the singer's voice is provided. The pitch of the song signal recorded in the accompaniment recording medium for karaoke is detected by a first pitch detecting facility. The pitch of the song signal of the singer entered from the microphone is detected by a second pitch detecting facility. The two song signal pitches are compared in a comparing facility. When the pitches of the two signals are different, the output signal of the accompaniment is automatically changed by a pitch changing facility. The output signal of the pitch changing means and the signal of the microphone are summed up by an adder and produced. Without requring the singer to set the pitch change value, a karaoke sound processor capable of correcting the pitch automatically to a register comfortable for the singer is provided.

5 Claims, 5 Drawing Sheets

KARAOKE SOUND PROCESSOR FOR AUTOMATICALLY ADJUSTING THE PITCH OF THE ACCOMPANIMENT SIGNAL

FIELD OF THE INVENTION

The present invention relates to a karaoke apparatus using a recording medium recording the accompaniment and model song signals, and more particular to a karaoke apparatus possessing a function for transposing the key (pitch) of the accompaniment sound reproduced from the recording medium depending on the register of the user (singer).

BACKGROUND OF THE INVENTION

A karaoke apparatus is a machine for accompanying songs developed in Japan, with which the user sings into a microphone while playing back the accompanying music pre-recorded in the recording medium. The karaoke apparatus has recently been equipped with various functions such as a key control function (tonal pitch variable function) and an echo effect function so that the singer can sing songs more easily.

An example of the prior art of the conventional karaoke apparatus provided with a key control function is disclosed in the Japanese Patent Provisional Publication No. 204095/84, "Tonal pitch variable apparatus" which is incorporated herein by reference. In the conventional apparatus disclosed therein, the singer manipulates the apparatus to check the pitch of a tune recorded in the accompaniment recording medium for karaoke before singing the song, while the apparatus instructs the singer to produce voice to check the register of the singer, and the two are compared. The pitch of the tone is controlled depending on the result.

The constitution of the disclosed conventional tonal pitch variable apparatus comprises frequency analysis means for analyzing the frequency of the input signal to determine the pitch, register check means for preliminarily checking the registers of two different kinds of sound signals, that is, the accompaniment music signal and sound signal produced by the singer, separately entered from the result of pitch judgment by the frequency analysis means, frequency shift degree determining means for determining the frequency shift degree from the registers of two input sound signals checked by the register check means, and frequency shift means for shifting the frequency of one input sound by the shift degree determined by the frequency shift degree determining means.

In a thus composed conventional tonal pitch variable apparatus, the operation is described below.

First of all, a necessary portion of the accompaniment recording medium for karaoke, for example, the first chorus of the tune the singer is going to sing, is reproduced, and is fed into the frequency analysis means, the highest sound and lowest sound of the accompaniment recording medium for karaoke reproduced by using the register check means are checked.

Then the singer's voice is entered in the frequency analysis means. The singer sings do, re, mi, and so forth sequentially within the singer's own register. The voice of the singer is analyzed by the frequency analysis means, and the register of the singer is obtained by the register check-means.

In this way, the register of the tune recorded in the accompaniment recording medium for karaoke and the register of the singer are obtained. These registers are compared in the frequency shift degree determining means, and the frequency (pitch) shift degree is determined. For example, when the register of the accompaniment recording medium for karaoke is higher than the register of the singer, the frequency shift degree is determined so as to lower the pitch of the accompaniment recording medium for karaoke. Depending on this frequency degree, the reproduction pitch of the accompaniment recording medium for karaoke is lowered by the frequency shift means, so that reproduced sound in a pitch suited to the register of the singer is obtained.

In such a conventional constitution, the manipulation is complicated. That is, the necessary portion of the accompaniment recording medium for karaoke must be reproduced, and the register of the singer must be checked. It takes a long time until the singer can actually start singing to the karaoke. When many people enjoy the use of the karaoke, such manipulation is practically impossible.

SUMMARY OF THE INVENTION

To solve the problems of the prior art, the invention provides a karaoke sound processor capable of automatically correcting a singer's pitch, without complicated or lengthy manipulating to set the pitch shift degree by the singer. The invention provides a karaoke sound processor comprising a reproducing device of accompaniment recording medium for karaoke for reproducing the accompaniment, first pitch detecting means for detecting the pitch of the song signal produced by the accompaniment reproducing device, a microphone for detecting the voice signal of the singer, second pitch detecting means for detecting the pitch of the output signal of the microphone, comparing means for comparing the output signals of the first and second pitch detecting means, pitch changing means for changing the pitch by controlling the output signal of the accompaniment reproducing device by the output signal of the comparing means, and adding means for adding the output signal of the pitch changing means and the output signal of the microphone.

In this constitution, while the singer is singing to the karaoke, the pitch of the song signal recorded in the accompaniment recording medium for karaoke is detected, and the pitch of the song signal of the singer entered in the microphone is detected by the second pitch detecting means. The output signals of the first pitch detecting means and second pitch detecting means are compared by the comparing means, and when the pitch of the song entered in the microphone is higher or lower than the pitch of the song signal recorded in the accompaniment recording medium for karaoke, the pitch of the signal reproduced from the accompaniment recording medium for karaoke is changed by the pitch changing means depending on the degree of the difference.

The invention also provides a karaoke sound processor comprising an accompaniment reproducing device for reproducing the accompaniment recording medium for karaoke, song signal separating means for separating the song signal from the output signal of the accompaniment reproducing device, first pitch detecting means for detecting the pitch of the song signal produced by the song signal separating means, a microphone for detecting the voice signal of the singer, second pitch detecting means for detecting the pitch of the output signal of the microphone, comparing means for comparing the output signals of the first and second pitch detecting means, pitch changing means for changing the pitch by controlling the output signal of the accompaniment reproducing device by the output signal of the comparing means, and adding means for adding the output signal of the pitch changing means and the output signal of the microphone.

In this constitution, if the song signal is not independently recorded in the accompaniment recording medium for karaoke, the pitch of the song signal separated by the song signal separating means can be detected by the first pitch detecting means, and the pitch can be changed by controlling the output signal of the accompaniment reproducing device by using the result of comparison with the pitch of the singer detected by the second pitch detecting means by the comparing means.

DETAILED DESCRIPTION OF THE PREFERRED EMBODIMENT

Figure 1:
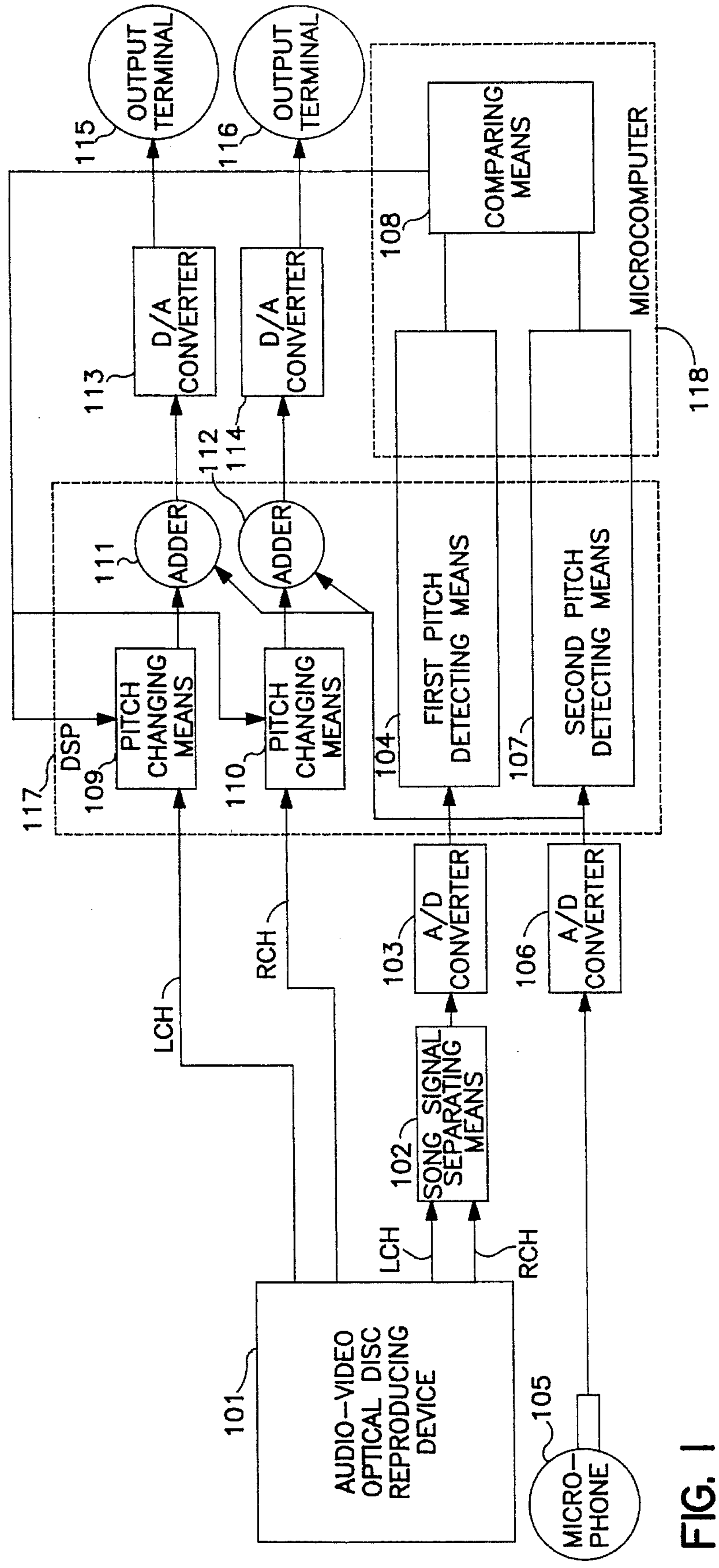
FIG. 1 is a block diagram of karaoke sound processor in an exemplary embodiment of the invention.

Referring now to the drawings, an exemplary embodiment of the invention is described in detail below.

The exemplary embodiment refers to a case of using an optical disc recording video signal and audio signal (hereinafter called audio-video optical disc) as a recording medium of accompanying music for karaoke. At the present, analog signals in the audio-video optical disc commercially sold for karaoke use are mostly of a sound multiplex system. In the sound multiplex system, the accompaniment sound signal for karaoke and the model song signal are recorded in the same recording medium. In the audio-video optical disc sound multiplex system, the "accompaniment signals" are recorded in the analog left channel, and the "accompaniment signals+song signals" in the analog right channel. Therefore, in the exemplary embodiment, song signal separating means for picking up only the song signals are provided. In the digital sound of the audio-video optical disc sound multiplex system, the accompaniment signals are recorded in stereo. In the audio-video optical disc, video signals are recorded together with audio signals, but their explanation is omitted herein.

FIG. 1 is a block diagram showing the constitution of a karaoke sound processor in an embodiment of the invention. An audio-video optical disc reproducing device 101, as reproducing device of accompaniment recording means for karaoke, reproduces the accompaniment music signals for karaoke recorded in the audio-video optical disc. As explained above, in the disc sound multiplex system, the "accompaniment signals" are recorded in the analog sound left channel, and the "accompaniment signals+song signals" in the analog sound right channel. Herein, song signal separating means 102 picks up only the song signals by subtracting the signals of the analog left channel from the signals of the analog right channel. The song signals of the audio-video optical disc separated by the song signal separating means 102 are converted into digital signals by an A/D converter 103, and processed by first pitch detecting means 104, and pitch data are obtained. The processing of the pitch detecting means 104 is described in detail later.

On the other hand, the output signal of the microphone 105 converting the voice of the singer into an electric signal is converted into a digital signal in an A/D converter 106, and processed by second pitch detecting means 107, and pitch data is obtained.

The pitch data of the song signal from the audio-video optical disc produced from the first pitch detecting means 104, and the pitch data of the song signal from the microphone input produced from the second pitch detecting means 107 are compared in comparing means 108. The method of comparison is explained later.

Left and right Channels of digital sound of the audio-video optical disc reproducing device 101 are entered in pitch changing means 109, 110, respectively. As a result of comparison by the comparing means 108, if the pitch of the song signal of the microphone input is judged to be lower than the pitch of the song signal recorded in the accompaniment recording medium for karaoke, the pitch changing means 109, 110 are controlled to lower the pitch. On the other hand, if the pitch of the song signal of the microphone input is judged to be higher, the pitch changing means 109, 110 are controlled to raise the pitch.

The output signals of the pitch changing means 109, 110 and the output signal of the A/D converter 106 are added in adders 111, 112, converted into analog signals in D/A converters 113, 114, and produced from output terminals 115, 116.

In this embodiment, parts of the pitch detecting means 104, 107, pitch changing means 109, 110, and adders 111, 112 are realized by a digital sound processor (DSP) 117, and the remaining parts of the pitch detecting means 104, 107 and comparing means 108 are realized by a microcomputer 118. The DSP may be, for example, LC83015 (manufactured by Sanyo Electric). The LC83015 comprises a ROM for storing various signal processing programs. This ROM also stores pitch changing programs, and by processing the input signals by the programs, the pitch change may be executed. The microcomputer 118 may be of the 8-bit type with a machine cycle of about 250 microseconds.

The first and second pitch detecting means 104, 107 are described below.

Figure 2:
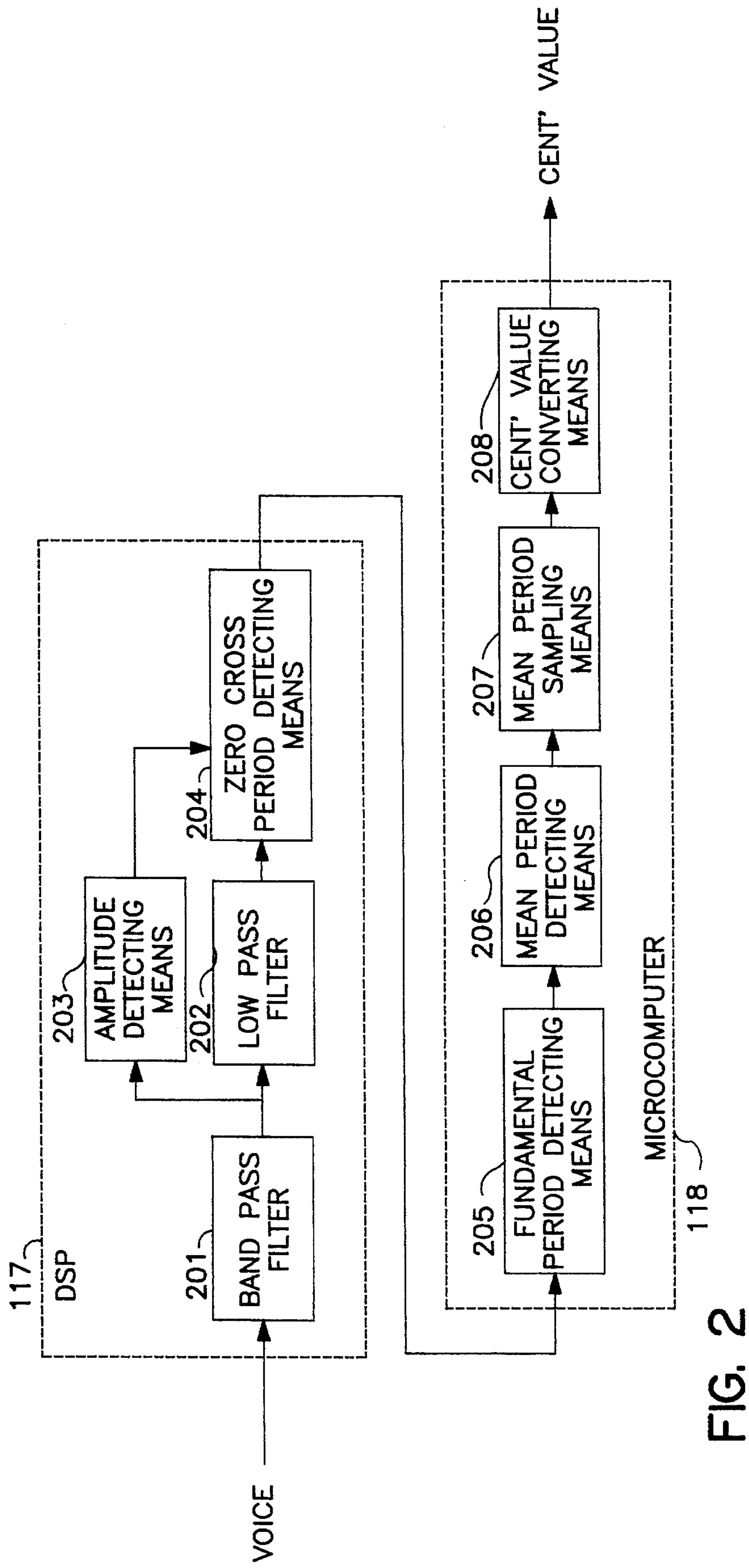
FIG. 2 is a block diagram of first and second pitch detecting means in the embodiment of FIG. 1.

A block diagram of pitch detecting means is shown in FIG. 2. The pitch detecting means is composed of, as mentioned above, the portion contained in the DSP 117 and the portion contained in the microcomputer 1181. The constitution is the same for the pitch detecting means 104 and 107.

In the first step, by a band pass filter 201, the frequency band components to be detected are picked up from the song signal from the microphone or the song signals from the audio-video optical disc. The passing band of the band pass filter 201 may be about 50 Hz to 500 Hz.

Next, by a low pass filter 202, harmonic components are attenuated, and the fundamental waves are relatively enhanced. The cut-off frequency of the low pass filter may be about 100 Hz, and the characteristic should decline from above the cut-off frequency at a gradient of, for example, 12 dB/octave.

Amplitude detecting means 203 receives the output of the band pass filter 201 and holds the signal rectified on one side at time constant 100 ms.

Figure 3:
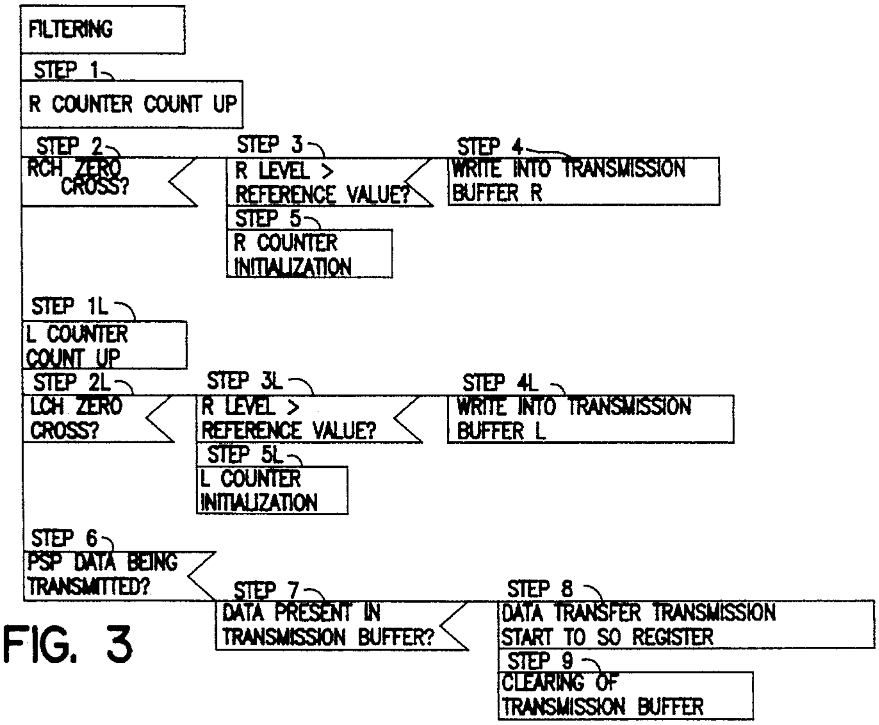
FIG. 3 is a PAD diagram showing the processing sequence of zero cross transmission in the embodiment of FIG. 1.

FIG. 3 is a PAD diagram showing the processing sequence of zero cross detection and transmission in this embodiment. In this embodiment, the pitch detecting means 107 is assigned to the left channel (L ch), and the pitch detecting means 104 to the right channel (R ch) in processing.

The processing in R channel is explained below. In zero cross period detecting means 204, the zero cross period counter is counted up in every sampling period (step 1), and the zero cross point is judged by comparing the codes of the present data and the data one sample before (step 2). If the zero cross point is recognized, it is judged whether the amplitude of the corresponding channel is more than the reference value or not (step 3). If the amplitude is more than the reference value, the count value is judged to be a valid zero cross period (the zero crossing interval of signal expressed by the sampling period), and this zero cross period is transferred to the transmission buffer (defined in the user RAM of DSP) (step 4). Afterwards, the zero cross period counter is reset (step 5). Zero cross is detected separately in L and R channels, and the processing is identical.

An SO register is a register for serial communication of the DSP 117 with the outside. When the SO register is empty (step 6), and there are data in the transmission buffer (step 7), the data in the transmission buffer are transferred to the SO register (step 8). The data set in the SO register is read out by the clock from the microcomputer 118. Later, this transmission buffer is cleared (step 9). The microcomputer 118, after receiving the data, processes the period detection, and when it is over, it is ready to receive the next data.

This is the processing assigned to the DSP 117 of the pitch detecting means 104.

Explained next is the processing assigned to the microcomputer 118 of the pitch detecting means 104.

The microcomputer 118 receives the zero cross period from the DSP 117, and determines the period accordingly.

The period detection processing by the microcomputer 118 is executed in the following four constituent parts as shown in FIG. 2. The procedure of period detection processing is shown in PAD in FIG. 4.

1) Fundamental period detecting means 205

Figure 5:
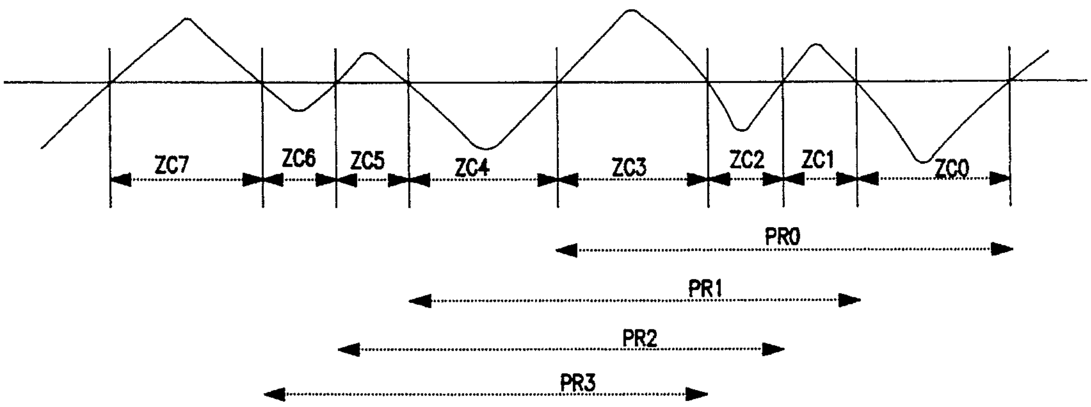
FIG. 5 is a waveform diagram explaining the fundamental period detection.

FIG. 5 shows the mode of detection of fundamental period (pr0) from the zero cross period (zc0) received from the DSP. FIG. 5 is a waveform in which the zero cross due to effects of second harmonics is left over in the low pass filter output.

The microcomputer 118 receives the zero cross period (zc0) from the DSP 117, compares it with three past zero cross periods (zc2, zc4, zc6) sequentially, and calculates the fundamental period (pr0) from the previous zero cross periods if the ratio is within a specific rate.

The fundamental period detecting algorithm is as follows. First, the zero cross period (zc0) is transferred from the DSP 117 to the microcomputer 118. This processing is an external interrupt processing on the microcomputer 118 side. In the zero cross period, data of two channels are transferred at once, but if there are data only in one channel, the channel without data is transferred by 0000 as a dummy. If the data is 0000, the microcomputer 118 does not process period detection. If there is zero cross data (step 1), a fundamental period detection flag (ZP) is set up provisionally (step 2) in the first place. As a candidate of fundamental period, zc0+zc1 is scrutinized (step 3). If the zero cross is generated by the fundamental wave components only, zc0+zc1 is the fundamental period. In this case, zc0 and zc2 are negative side components of the adjacent waveforms, and are expected to be nearly the same in length. In the case of the waveform in FIG. 5, however, since the lengths of zc0 and zc2 are largely different, the possibility of zc0+zc1 as the fundamental period is negated (step 4).

As a next candidate of fundamental period, zc0 zc1+zc2+zc3 is scrutinized (step 5). Just as above, zc0 and zc4 are compared, and they are assumed to be nearly identical. Hence zc0+zc1+zc2+zc3 is employed as the fundamental period (step 6). If zc0 and zc4 are largely different, zc0+zc1+zc2+zc3+zc4+ zc5 is scrutinized as another candidate (step 7), and zc0 and zc6 are compared (step 8). If largely different as a result of comparison again, the fundamental period is not detected, and the fundamental period detection flag (ZP) is reset (step 9).

2) mean period detecting means 206

The detected fundamental period (pr0) is compared with the past three fundamental periods (pr1 to 3), and it is checked whether all these ratios are within a specific rate or not to judge erroneous detection. If erroneous detection is not judged, these four fundamental periods are averaged to obtain the mean period (apr0). The processing so far is executed every time the zero cross period is received.

Figure 4:
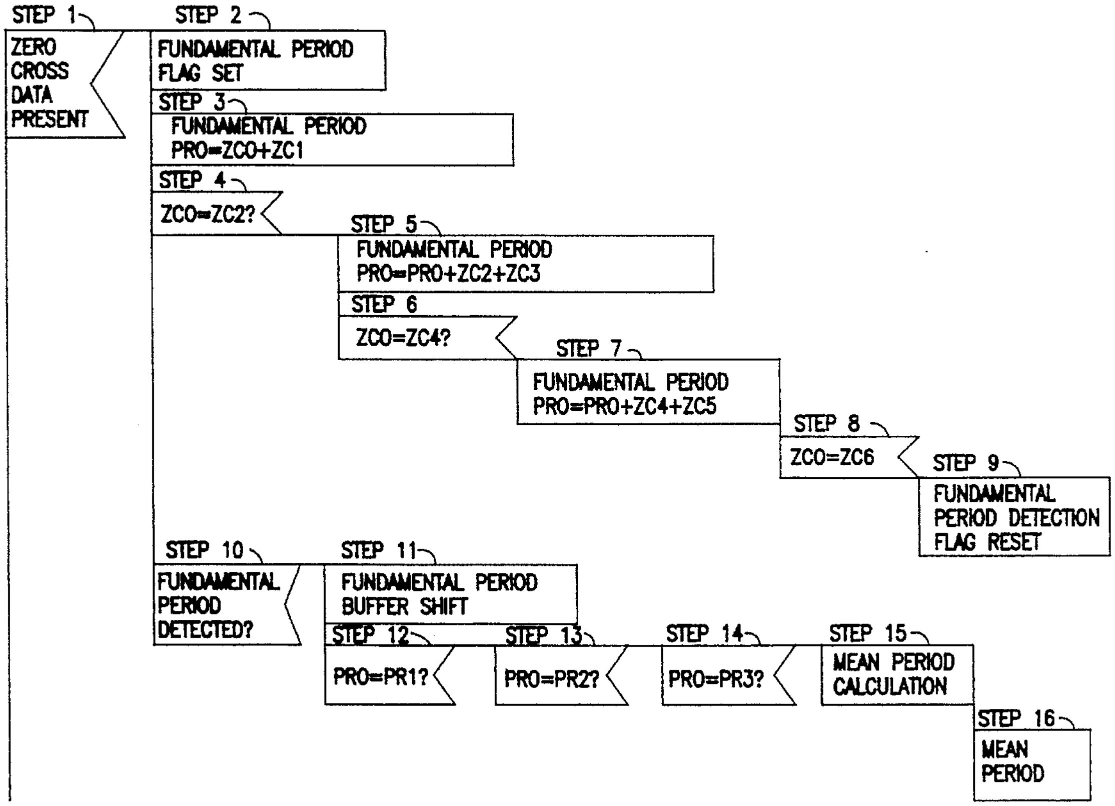
FIG. 4 is a PAD diagram showing the processing sequence of period detection.

The mean period detection processing corresponds to the procedure after step 10 in the PAD shown in FIG. 4.

First, by the fundamental period detection flag, it is judged whether the fundamental period has been detected or not in the present reception of the zero cross period (step 10).. If the fundamental period is detected, the fundamental period buffer is shifted (step 11). That is, the fundamental periods pr0 to pr2 detected in the past are sequentially shifted to pr1 to pr3, and the latest fundamental period is determined as pr0. The latest fundamental period (pr0) is then sequentially compared with the past three fundamental periods (pr1 to pr3) (steps 12 to 14). When these ratios are within a specific rate, the possibility of erroneous detection of the fundamental periods is low, and these fundamental periods are regarded as being valid. The mean period is calculated (step 15). Finally, the mean period detection flag is set (step 16).

3) Mean period sampling means 207

The microcomputer 118 checks whether the mean period detection flag is set up or not in every specific time (about 10 ms), samples the mean period (if set up), and resets the mean period detection flag. The sampled mean period (apr0) is compared with the previous mean period (apr1), and if this ratio is within a specific rate, this mean period (apr0) is judged to be valid. If valid, the mean period is stored in the buffer (apr1).

4) cent' value converting means 208

When the mean period is judged to be valid, the frequency is determined from the mean period (apr0), and it is further converted into a cent' value. The cent' value C is defined by formula (1).

$$C=A*\log_2(t0/t) \qquad (i)$$

In formula (1), t0=1/F0 where F0 is a reference frequency, and $A=2^n$ where n is an integer. When the period is t [s], the cent' value c is as shown in formula (1a).

$$c=1024*\log_2(t0/t),\ t0=1/55 \qquad (1a)$$

As the method of conversion, a table in a format of reading the cent' value, with the mean period as index, is used. In this table, when the mean period is short, the interval of the cent' values becomes longer, and therefore it is efficient to narrow the calibration intervals of mean period and widen the calibration intervals gradually as the mean period becomes longer.

This ends the description of the pitch detecting means 104, 107.

Next, the comparing means 108 is explained.

The pitch detecting means 104, 107 detect the pitch of song signal in every specific time (10 ms). However, the pitch may not be always be detected. Yet, the detected values are momentary values, and instead of comparing them directly, it is easier in processing to average them to a certain extent. In this embodiment, the data are judged valid only when both the pitch detecting means 104 and 107 have successfully detected the pitch. Every eight valid data are averaged to be used in the control of pitch changing means 109, 110.

Figure 6:
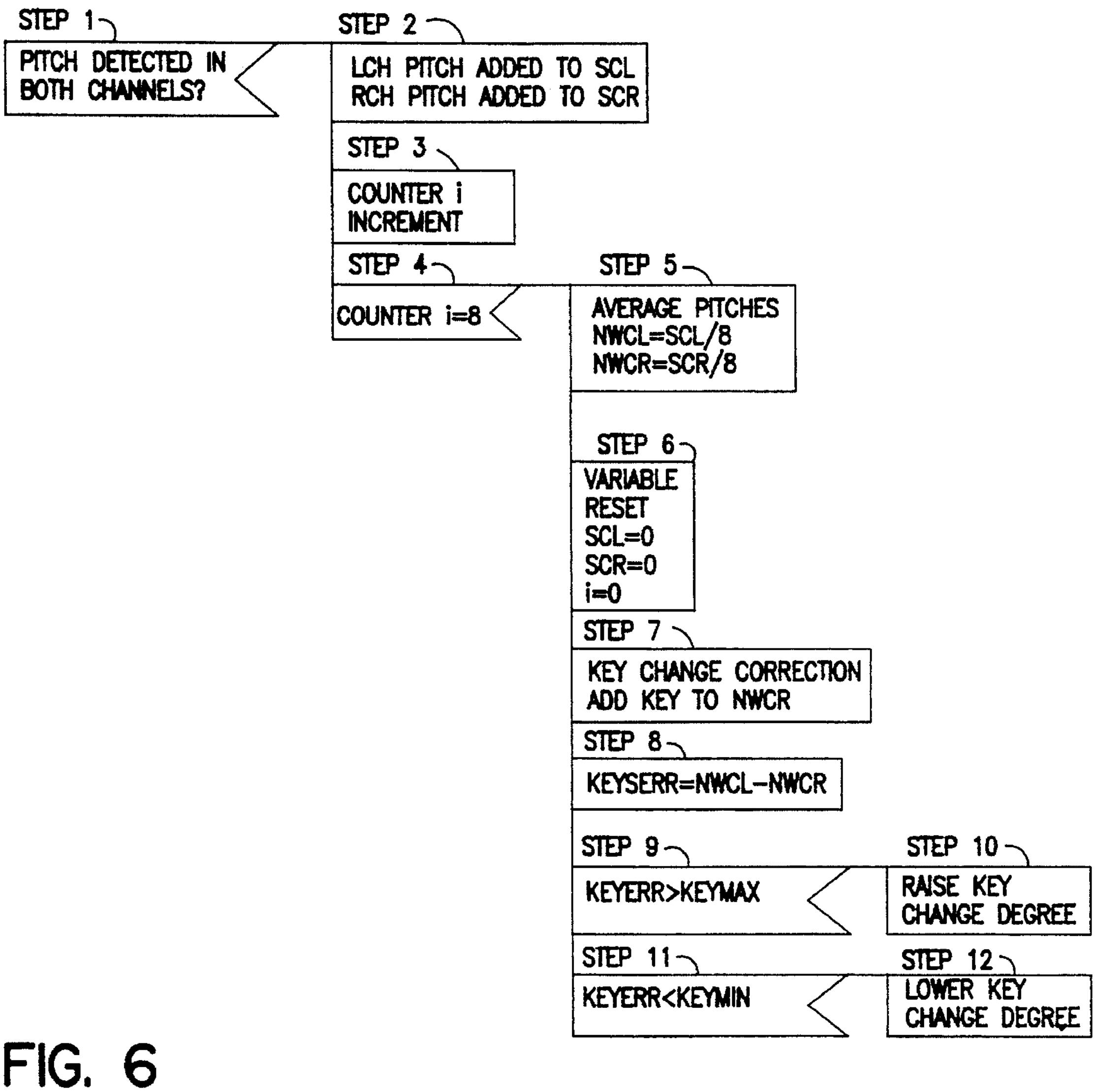
FIG. 6 is a PAD diagram showing the processing sequence of comparing means.

The processing procedure of the comparing means is shown in a PAD diagram in FIG. 6.

It is first judged whether both pitch detecting means 104 and 107 have detected the pitch or not (step 1). If both have detected, the detection result of the pitch detecting means 107 (that is, the pitch of the song signal entered from the microphone 105) is added to a pitch cumulative variable scL, and the detection result of the pitch detecting means 104 (that is, the pitch of the song signal recorded in the audio-video optical disc) is added to a pitch cumulative variable scR (step 2). The counter variable i is increased by 1 (step 3). It is then checked whether the counter variable i has reached 8 or not (step 4). When the counter variable i reaches 8, averaging and judging are effected, and depending on the result of judgment, the pitch changing means 109, 110 are controlled. First, by 1/8 of scL, the mean pitch nxcL is determined. Likewise, 1/8, xcR is nwcR (step 5). Later, scL, scR, and i are cleared to zero (step 6). If the pitch changing means 109, 110 have already changed the pitch, the present pitch change value key[cent'] is added to nwcR to correct (step 7). Subtracting nwcR from nwcL, the error keyerr of the pitch detection result is determined (step 8).

The error keyerr is a cent' value. Therefore, if there is an error over one octave, it is ±1024 or more. However, what is valid as a pitch error is the excess portion of the error over 1024. Furthermore, +512[cent'] and −512[cent'] are actually of the same pitch. Therefore, when, the lower n bits, for example the lower 10, bits of keyerr are handled as 2's complement (i.e., when bits 11 and above are ignored), the errors of pitch detecting means 104, 107 settle within a range of ±512[cent'].

When the error keyerr is thus determined and keyerr is larger than the reference value keymax (step 9), the pitch change degree key of the pitch changing means 109 and 110 is raised (step 10). When keyerr is smaller than keymin (step 11), the pitch change degree key is lowered (step 12), by sending such coefficients to the pitch changing means 109, 110. Preferably, keymax and keymin should be +50[cent'] and −50[cent'], respectively, and one change width Δkey of pitch change degree, about 5[cent']. By setting such parameters, momentary effects such as a deviation of timing of the song signal may be eliminated, and pitch changes become smooth, so that it may be easier to sing the song.

Figure 7:
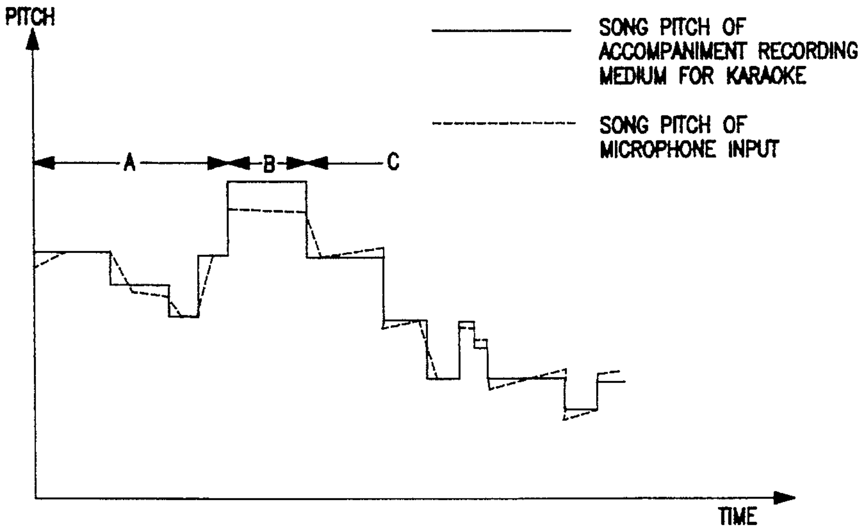
FIG. 7 is a diagram showing an example of pitch changes.

Incidentally, the pitch changing means 109, 110 may be controlled also in a method different from the control method of the pitch changing means in the exemplary embodiment. For example, as shown in FIG. 7, suppose the pitch changes with time. In the part of section b, the input pitch from the microphone 105 may be lowered, or the microphone input may be interrupted because the singer cannot sing a high note. In this way, if the microphone input is interrupted in the high or low pitch part of the song, the pitch of the pitch changing means 109, 110 may be lowered or raised by controlling, so that it may be adjusted to the register comfortable for the singer.

Various types are commercially available as the recording media of accompanying music for karaoke. Aside from the analog sound of audio-video optical disc of sound multiplex system explained in the exemplary embodiment, there are other accompaniment recording media for karaoke in the forms of compact disc and compact tape of ordinary stereo recording, compact disc and compact tape of sound multiplex karaoke system, and others.

Using a compact disc (or compact tape) of an ordinary stereo recording, a karaoke sound processor is realized by picking up only the accompaniment sound by mutually cancelling the same phase components in the voice bands in the right and left channels. In such a case, the song signal separating means 102 may pick up the song signal by adding the components of the voice bands in the right and left channels.

In the compact disc or compact tape of a sound multiplex karaoke system, the accompaniment signals are recorded in the left channel, and the song signals in the right channels. When using such a compact disc or compact tape sound multiplex karaoke system, the song signal separating means 102 is not needed.

Thus, according to the invention, by detecting the pitch of the song signal recorded in the accompaniment recording medium for karaoke and the pitch of the song signal of the singer entered through the microphone by the first and second pitch detecting means, and comparing them by the comparing means, the output signal of the accompaniment recording medium for karaoke may be automatically transposed in pitch by the pitch changing means if the pitches of these two signals are different, thereby correcting to the pitch easier to sing in by the singer.

What is claimed:

1. A karaoke sound processor including a microphone for detecting a voice signal of a singer and for producing a microphone output signal, said karaoke sound processor comprising:

an accompaniment reproducing device for reproducing an accompaniment signal and a song signal from a recording medium;

first pitch detecting means for detecting a pitch of the song signal at a first specified instant of time, and for producing a first detector output signal;

second pitch detecting means for detecting a pitch of the microphone output signal at a second specified instant of time, and for producing a second detector output signal wherein said second specified instant of time is one of identical to and different from said first specified instant of time;

comparing means for comparing the first detector output signal to the second detector output signal, to form a comparing means output signal;

pitch changing means for changing the pitch of the accompaniment signal according to the comparing means output signal, to form an adjusted accompaniment signal; and combining means for combining the adjusted accompaniment signal and the microphone output signal to form a combined karaoke sound processor output signal.

2. The karaoke sound processor of claim 1, wherein:

the comparing means compares the pitch of the song signal component reproduced from the recording medium to the pitch of the microphone output signal, and the pitch changing means include:

means for lowering the pitch of the accompaniment signal component when the pitch of the microphone output signal is lower than the pitch of the song signal component, and means for raising the pitch of the accompaniment signal component when the pitch of the microphone output signal is higher than the pitch of the song signal component.

3. The karaoke sound processor of claim 1, wherein the first detector output signal and the second detector output signal each represent a respective detected period t in a cent' value c defined by the equation:

$$c = A * \log_2(t0/t),$$

where:

$$t0 = 1/f0,$$

f0 is a reference frequency, $A = 2^n$, n is an integer, and the comparing means compares the lower n bits of a mean of the cent' value to compute a desired pitch change.

4. The karaoke sound processor of claim 1, wherein:

the comparing means compares a mean pitch of the song signal component reproduced from the recording medium to a mean pitch of the microphone output signal, and the pitch changing means includes:

means for lowering the pitch of the accompaniment signal component when the mean period of the microphone output signal is longer than the mean period of the song signal component, and means for raising the pitch of the accompaniment signal component when the mean period of the microphone output signal is shorter than the mean period of the song signal component.

5. The karaoke sound processor of claim 4, wherein the comparing means includes means for computing the respective mean pitches of the song signal component and the microphone output signal based only on values of the song signal component and the microphone output signal collected when the respective pitches of both the song signal component and the microphone output signal are detected.

* * * * *

UNITED STATES PATENT AND TRADEMARK OFFICE

CERTIFICATE OF CORRECTION

PATENT NO. : 5,477,003
DATED : December 19, 1995
INVENTOR(S) : Muraki et al.

It is certified that error appears in the above-indentified patent and that said Letters Patent is hereby corrected as shown below:

In column 8, delete lines 40-66 (claim 1) and substitute therefore:

1. A karaoke sound processor comprising:

an accompaniment reproducing device for reproducing an output signal that includes an accompaniment signal component and a song signal component from a recording medium;

song signal separating means for separating the song signal component from the accompaniment signal component;

first pitch detecting means coupled to the song signal separating means for detecting a pitch of the song signal component, and for producing a first detector output signal;

a microphone for detecting a voice signal of a singer and for producing a microphone output signal;

second pitch detecting means for detecting a pitch of the microphone output signal, and for producing a second detector output signal;

UNITED STATES PATENT AND TRADEMARK OFFICE

CERTIFICATE OF CORRECTION

PATENT NO. : 5,477,003

DATED : December 19, 1995

INVENTOR(S) : Muraki et al.

It is certified that error appears in the above-indentified patent and that said Letters Patent is hereby corrected as shown below:

comparing means for comparing the first detector output signal to the second detector output signal, to form a comparing means output signal;

pitch changing means for changing the pitch of the accompaniment signal component according to the comparing means output signal, to form an adjusted accompaniment signal; and combining means for combing the adjusted accompaniment signal and the microphone output signal to form a combined karaoke sound processor output signal.

Signed and Sealed this

Twenty-ninth Day of October 1996

Attest:

Bruce Lehman

BRUCE LEHMAN

*Attesting Officer*

*Commissioner of Patents and Trademarks*